(12) United States Patent
Wakamatsu

(10) Patent No.: US 9,031,396 B2
(45) Date of Patent: May 12, 2015

(54) IMAGE SHAKE CORRECTING APPARATUS AND CONTROL METHOD FOR SAME, LENS BARREL, OPTICAL APPARATUS, AND IMAGING APPARATUS

(71) Applicant: Canon Kabushiki Kaisha, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/339,745

(22) Filed: Jul. 24, 2014

(65) Prior Publication Data

US 2015/0036011 A1    Feb. 5, 2015

(30) Foreign Application Priority Data

Aug. 1, 2013    (JP) .................................. 2013-160278

(51) Int. Cl.
*G03B 17/00*        (2006.01)
*H04N 5/232*        (2006.01)
*G02B 27/64*        (2006.01)

(52) U.S. Cl.
CPC ............ *H04N 5/2328* (2013.01); *G02B 27/646* (2013.01)

(58) Field of Classification Search
USPC ........................................................ 396/55
See application file for complete search history.

(56) References Cited

U.S. PATENT DOCUMENTS

| 6,393,215 B1 * | 5/2002 | Washisu .......................... 396/52 |
| 2009/0219402 A1 * | 9/2009 | Schneider .................. 348/208.7 |
| 2011/0242338 A1 * | 10/2011 | Bousquet et al. .......... 348/208.2 |

FOREIGN PATENT DOCUMENTS

| JP | 5-323436 A | 12/1993 |
| JP | 10-10596 A | 1/1998 |

OTHER PUBLICATIONS

U.S. Appl. No. 14/341,947 to Nobushige Wakamatsu, filed Jul. 28, 2014.
U.S. Appl. No. 14/337,288 to Nobushige Wakamatsu, filed Jul. 22, 2014.

* cited by examiner

*Primary Examiner* — Clayton E Laballe
*Assistant Examiner* — Dennis Hancock
(74) *Attorney, Agent, or Firm* — Fitzpatrick, Cella, Harper & Scinto

(57) ABSTRACT

The CPU acquires the output of an angular velocity sensor and performs image shake correction. An angle 1 calculating unit integrates a signal from which an offset component is removed to calculate an angle 1. An angular velocity subtraction amount calculating unit calculates an angular velocity subtraction amount based on a signal obtained by subtracting a first offset from the output of the angular velocity sensor and a signal obtained by subtracting a second offset from the output of the angle 2 calculating unit. An angle 2 calculating unit integrates a signal obtained by subtracting the angular velocity subtraction amount from the output of the angular velocity sensor to calculate an angle 2. The CPU performs image shake correction based on the angle 1 prior to operation of a release SW, whereas the CPU performs image shake correction based on the angle 2 after operation of the release SW.

17 Claims, 14 Drawing Sheets

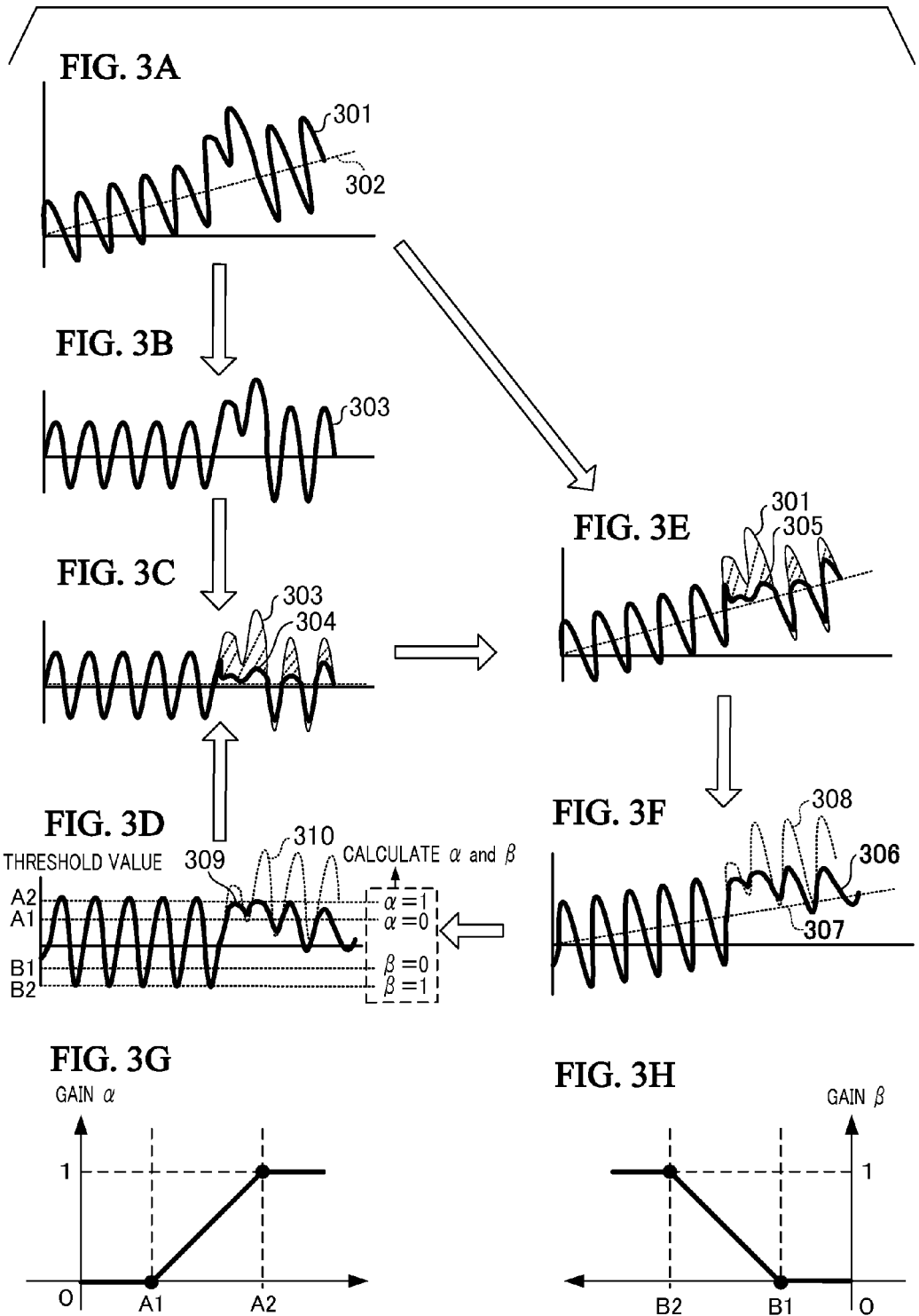

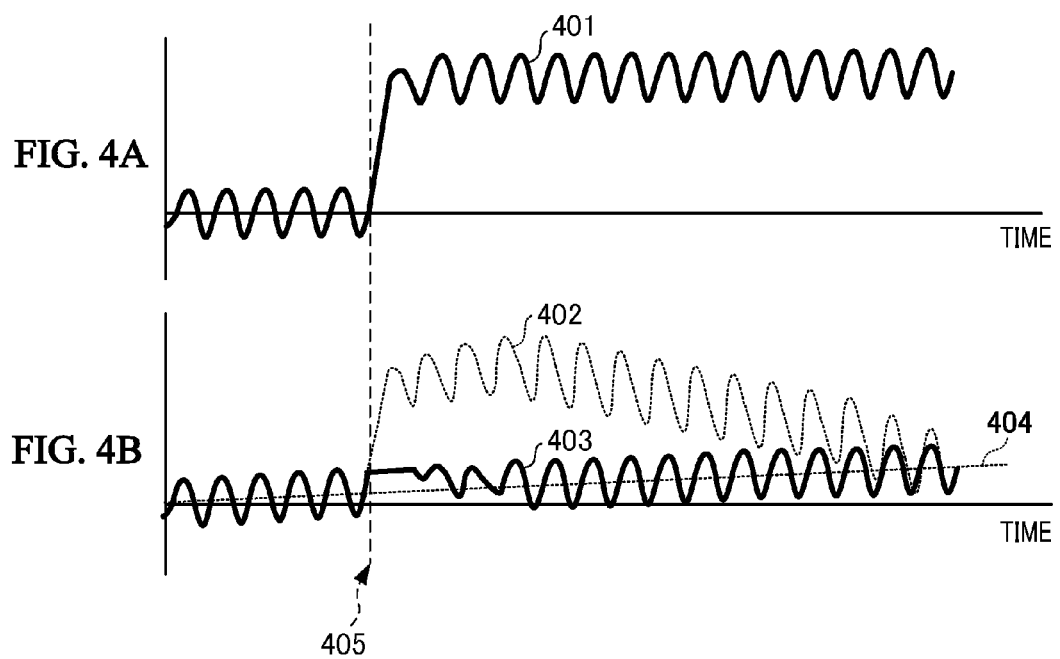
FIG. 4A
FIG. 4B
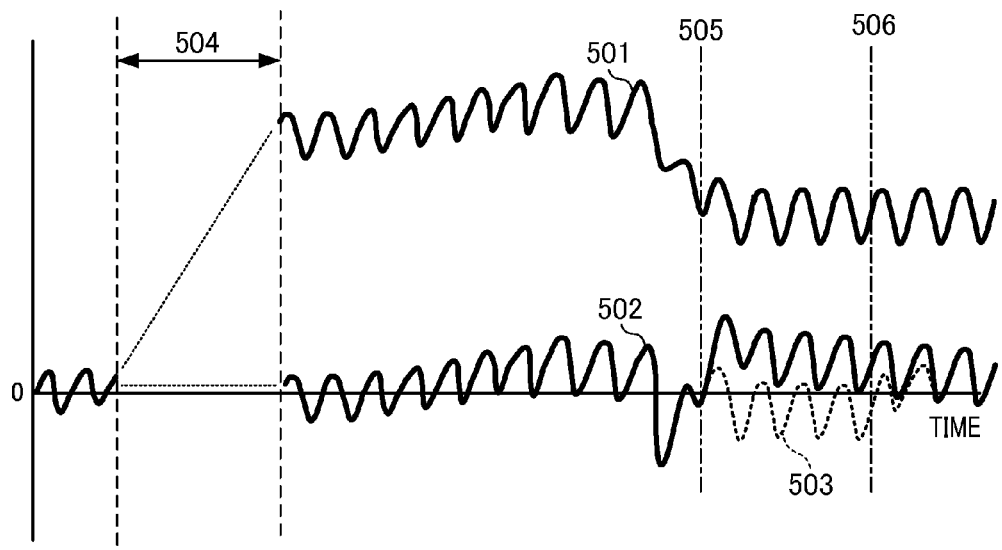
FIG. 5

IMAGE SHAKE CORRECTING APPARATUS AND CONTROL METHOD FOR SAME, LENS BARREL, OPTICAL APPARATUS, AND IMAGING APPARATUS

BACKGROUND OF THE INVENTION

1. Field of the Invention

The present invention relates to an image shake correction technique for correcting an image shake caused by shake such as hand shake, and also relates to correction processing for smoothly correcting the low frequency component of shake.

2. Description of the Related Art

In cameras having an image shake correcting apparatus for preventing image shake caused by hand shake or the like mounted therein, shooting can be performed without image shake even when hand shake occurs upon shutter release. An angle shake of a camera caused by hand shake or the like is detected and then an image shake correction lens (hereinafter referred to as "correction lens") is driven depending on a detection value. At this time, camera vibration needs to be correctly detected so as to correct an optical axis change caused by shake. In principle, a vibration detecting unit configured to obtain the results of detection such as an angular velocity and a drive control unit configured to displace a correction lens based on the results of calculation processing are mounted in a camera so as to suppress image shake.

The output signal of a sensor for detecting camera vibration includes a direct current component such as variations in reference voltage due to individual differences in sensors and drifts in accordance with a change in temperature. If the sensor output includes low frequency component noise, such low frequency component noise may lead to deterioration in correction precision. Thus, in order to remove an offset component, a low frequency component is typically removed from the output signal of a sensor using an HPF(high-pass filter) so as to obtain an image shake correction signal.

When a user performs an operation, such as panning or tilting, for moving an imaging apparatus in one direction for a relatively long period of time, the output signal of a sensor includes a large amount of low frequency components, and thus, low frequency components need to be attenuated upon image shake correction. There has been known control for determining whether panning or tilting is being performed based on data of angular velocity and data of angle obtained by integration of angular velocity so as to perform switching to a correction characteristic suitable for panning or tilting. Control is made such that image shake correction does not respond to a low frequency by transitioning the cut-off frequency of an HPF or an integrating filter to a higher frequency side. Japanese Patent Laid-Open No. H5-323436 discloses image shake correction control in the panning state or the tilting state, which is capable of performing image shake correction for high frequencies while suppressing the response at low frequencies. Japanese Patent Laid-Open No. H10-010596 discloses anti-shake control by fixing an offset during imaging without performing HPF processing during imaging (exposure).

In the conventional configuration for attenuating a low frequency component using an HPF for removing an offset component, the following phenomenon occurs. If the output of an angular velocity sensor includes a low frequency noise component upon image shake correction based on the output of the angular velocity sensor, unsuitable correction is made to actual camera shake. In addition, image shake correction may be adversely affected by a filter characteristic including a secondary HPF due to panning or the like. The low frequency component of large amplitude is attenuated by the occurrence of vibration caused by panning or the like, and a signal in a direction reverse to the panning direction is generated, for example, upon completion of panning (so-called "swing-back phenomenon"). The signal is then slowly converged to zero. However, if image shake correction is performed based on the signal, the correction amount is calculated by a signal which is different from the actual shake of an imaging apparatus, which may lead to deterioration in correction precision.

If the cut-off frequency of the HPF is set to low in the filter configuration including the HPF, the performance of image shake correction for low frequency components associated with vibration or the like of the photographer's body can be improved. In this case, the magnitude of a swing-back signal becomes large and the time to be taken until the signal is converged to zero becomes longer after the occurrence of large vibration caused by panning or the like. Thus, an appropriate image shake correction effect may be obtained only when the photographer captures an image with his camera firmly held by his hands so as not to excite shake of the imaging apparatus.

SUMMARY OF THE INVENTION

The present invention provides a technique for realizing stable image shake correction in a wide frequency band even when a large shake occurs due to panning or the like.

According to an aspect of the present invention, an image shake correcting apparatus is provided that includes a shake detecting unit configured to detect shake of an apparatus; a calculating unit configured to calculate an image shake correction amount by acquiring a shake detection signal output from the shake detecting unit; and a shake correcting unit configured to correct image shake in accordance with the image shake correction amount calculated by the calculating unit. The calculating unit further includes a first offset calculating unit configured to calculate a first offset from the shake detection signal; a second offset calculating unit configured to calculate a second offset from the shake detection signal; and a subtraction amount calculating unit configured to calculate a subtraction amount by acquiring a signal obtained by subtracting the first offset from the shake detection signal and a signal obtained by subtracting the second offset from the image shake correction amount, and the calculating unit integrates a signal obtained by subtracting the subtraction amount calculated by the subtraction amount calculating unit from the shake detection signal to calculate the image shake correction amount.

According to the present invention, a technique for realizing stable image shake correction in a wide frequency band even when a large shake occurs due to panning or the like may be provided.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, and 3H are explanatory diagrams illustrating a subtraction amount calculating unit according to the first embodiment of the present invention.

FIGS. 4A and 4B are explanatory diagrams illustrating shake correction amount calculation processing according to the first embodiment of the present invention.

FIG. 5 is an explanatory diagram illustrating shake correction amount calculation processing during imaging and at the period other than the imaging period according to the first embodiment of the present invention.

DESCRIPTION OF THE EMBODIMENTS

Hereinafter, preferred embodiments of the present invention will be described with reference to the drawings. The present invention is applicable to, for example, an interchangeable lens attached to a digital single lens reflex camera, optical equipment such as a lens barrel, an imaging apparatus such as a digital video camera, a monitoring camera, a Web camera, or the like, and electronic equipment including an imaging apparatus, such as a mobile phone, a tablet terminal, or the like.

Firstly, a description will be given of an angle calculating filter (included in an angle calculating unit to be described below) for use in an image shake correcting apparatus. An angle calculating filter for use in image shake correction based on the output of an angular velocity sensor is a filter which combines an integrator and an HPF as shown on the left side of the following formula (1). As shown on the right side of the following formula (1), this is the same as Formula obtained by multiplying the low-pass filter (LPF) with time constant T by the time constant T.

[Formula 1]
$$\frac{1}{s} \times \frac{Ts}{Ts+1} = \frac{T}{Ts+1} \quad (1)$$

The symbol T on the left side of Formula (1) represents a time constant of the HPF, and the symbol T on the right side of Formula (1) represents a time constant of the LPF.

When the output of the angular velocity sensor includes a low frequency noise component, correction which is different from the actual camera shake is performed, resulting in induction in shake conversely. In order to prevent the calculation result of an angle signal from being saturated upon integral calculation, a filter with a characteristic shown on the right side of Formula (1) is used. The angle calculating filter includes an HPF. Hence, if another HPF is connected to a previous stage of the angle calculating filter, a filter from the output of the angular velocity sensor to angle calculation is constituted by a secondary HPF. Thus, a phase advances largely in the low frequency band of hand shake, resulting in a reduction in correction effect. Hereinafter, a description will be given of a configuration for performing highly-accurate shake correction in a wide frequency band during imaging in sequence in accordance with embodiments of the present invention.

First Embodiment

Figure 1:
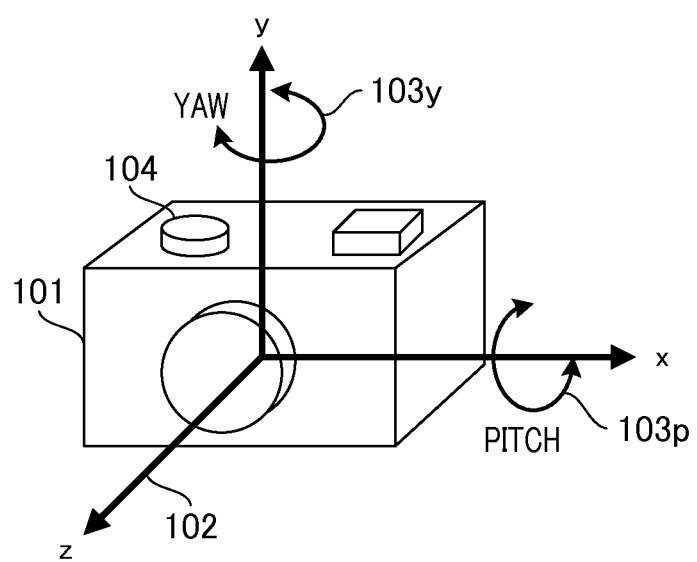
FIG. 1 is an explanatory diagram illustrating shake directions relating to image shake correction according to the present invention.
Figure 2:
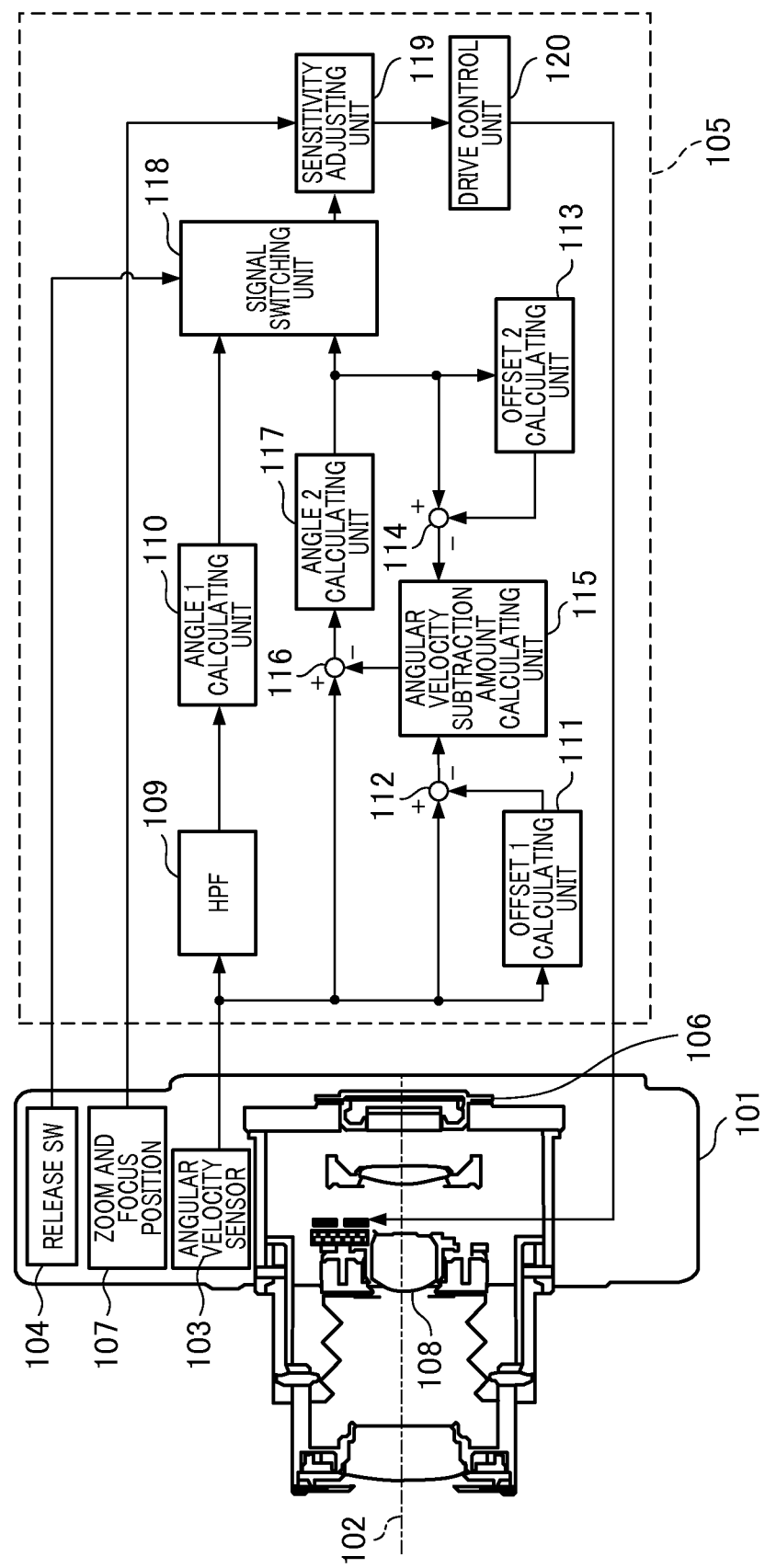
FIG. 2 is a top view and a control block diagram illustrating an imaging apparatus according to a first embodiment of the present invention.

FIG. 1 is a schematic perspective view illustrating an imaging apparatus including the image shake correcting apparatus according to the first embodiment of the present invention. FIG. 2 illustrates a configuration of an imaging unit of an imaging apparatus and a functional block diagram of image shake correction processing executed by a CPU (Central Processing Unit) 105.

The body of a camera 101 includes a release button. The open/close signal of a switch (release SW) 104 by the operation of the release button is sent to the CPU 105 of the camera 101. The correction lens of a shake correcting unit 108 and an imaging element 106 are located on the optical axis 102 (the z-axis in FIG. 1) of an imaging optical system. An angular velocity sensor 103 is a shake detecting unit that detects angle shake in the pitch direction indicated by arrow 103p and the yaw direction indicated by arrow 103y so as to output a shake detection signal. In FIG. 1, the x-axis indicates the first axis (pitch rotation axis) orthogonal to the z-axis, and the y-axis indicates the second axis (yaw rotation axis) orthogonal to the z-axis and the x-axis.

A shake detection signal (angular velocity detection signal) output from the angular velocity sensor 103 is input to the CPU 105. An HPF (high-pass filter) 109 cuts off the DC (direct current) component of the output of the angular velocity sensor 103 so as to remove an offset component to be added as detection noise. An angular velocity signal passed through the HPF is integrated by a first angle calculating unit (hereinafter referred to as "angle 1 calculating unit") 110 so as to be converted into an angle signal. The CPU 105 determines a panning or a tilting operation depending on the magnitude of the angular velocity. Setting is made such that image shake correction does not respond to a low frequency by shifting the cut-off frequency of the HPF 109 to a higher frequency side during a panning or a tilting operation. Hereinafter, a description will be given of image shake correction processing by taking an example of a panning operation, but the same processing is also performed for a tilting operation.

In the present embodiment, angle calculation performed by a first calculating unit including the angle 1 calculating unit 110 is executed in parallel with angle calculation performed by a second calculating unit including a second angle calculating unit (hereinafter referred to as "angle 2 calculating unit") 117. Image shake is suppressed based on the output of the angle 1 calculating unit 110 prior to imaging (exposure), whereas image shake correction control is made based on the output of the angle 2 calculating unit 117 during imaging (exposure).

The output of the angular velocity sensor 103 is input to the subtracting unit 116, and the output value of the angular velocity subtraction amount calculating unit (hereinafter referred to as "subtraction amount calculating unit") 115 is subtracted from the output of the angular velocity sensor 103. The output of the subtracting unit 116 is input to the angle 2 calculating unit 117, and then is converted into an angle signal. Calculation performed by the subtraction amount calculating unit 115 will be described in detail below.

The first angle (hereinafter referred to as "angle 1") calculated by the angle 1 calculating unit 110 and the second angle (hereinafter referred to as "angle 2") calculated by the angle 2 calculating unit 117 are input to a signal switching unit 118. The signal switching unit 118 selects the first image shake correction amount based on the angle 1 or the second image shake correction amount based on the angle 2 so as to perform image shake correction. The output of the release SW 104 is input to the signal switching unit 118. It is determined whether or not the imaging operation has started based on the open/close signal of the release SW 104, and the signal switching unit 118 selects as to whether image shake correction is performed by using the angle 1 or image shake correction is performed by using the angle 2. The angle signal selected by the signal switching unit 118 is input to a sensitivity adjusting unit 119. The sensitivity adjusting unit 119 amplifies an angle signal, which is the output of the signal switching unit 118, based on positional information 107 about a zoom lens and a focus lens, and a focal distance and a shooting magnification determined thereby so as to calculate a target value for image shake correction. The target value is used for correcting the change in shake correction sensitivity on an imaging plane with respect to the shake correction stroke of the shake correcting unit 108 due to the change in optical information about a focus lens, a zoom lens, and the like. Note that the positional information 107 about a zoom lens and a focus lens is acquired from a known position detecting unit which is disposed within a lens barrel.

The target value for image shake correction calculated by the sensitivity adjusting unit 119 is input to a drive control unit 120, and then the shake correcting unit 108 including a correction lens is driven, so that image shake correction is performed. The shake correcting unit 108 includes an actuator and a drive mechanism unit for driving the correction lens. In the example shown in FIG. 2, so-called "optical anti-vibration" in which the correction lens serving as a shake correcting unit is moved within a plane perpendicular to the optical axis based on the calculated image shake correction amount is employed as the image shake correcting method. The image shake correcting method is not limited thereto but may also be performed by moving an imaging element within a plane perpendicular to the optical axis. Electronic anti-vibration method for mitigating the effects of hand shake or the like by changing the image segmenting position of each of captured frames output from the imaging element may further be employed as the image shake correcting method. Image shake correction may also be performed by combining a plurality of methods such that shake correction is performed by electronic anti-vibration prior to still image shooting and shake correction is performed by optical anti-vibration during still image shooting.

Next, a description will be given of angular velocity subtraction amount calculation processing. A first offset calculating unit (hereinafter referred to as "offset 1 calculating unit") 111 calculates an angular velocity offset component which is included in the output of the angular velocity sensor 103 as detection noise. The first offset which is the angular velocity offset component is denoted as "offset 1". For example, the output value of the angular velocity sensor 103 when a hand shake vibration applied to an imaging apparatus is very small, such as when the amplitude of the angular velocity passed through the HPF is small, when the amplitude of angular acceleration obtained by differentiating the angular velocity is small, and the like, is acquired. These output values are smoothly connected by an LPF of which the cut-off frequency is set to very low, so that the offset 1 is calculated as a DC component.

A second offset calculating unit (hereinafter referred to as "offset 2 calculating unit") 113 calculates an angle offset component from the output of the angle 2 calculating unit 117. The second offset which is the angle offset component is denoted as "offset 2". In this case, the output of the angle 2 calculating unit 117 is a sampling value (hereinafter referred to as "previous sampling value") obtained in the past point in time by a control cycle from the present point in time. For example, the sampling value is passed through an LPF of which the cut-off frequency is set to very low, and LPF calculation is stopped during the panning operation, so that the offset 2 is calculated while preventing offset incorrect calculation during the panning operation. Panning determination processing is performed based on the output of the angular velocity sensor 103. The CPU 105 determines that the panning operation is being performed if an angular velocity having a predetermined amplitude or greater is output for a time over a predetermined time.

The offset 1 (angular velocity offset) and the offset 2 (angle offset) are calculated as described above. A signal obtained by subtracting the offset 1 from the output of the angular velocity sensor 103 and a signal obtained by subtracting the offset 2 from the angle 2 calculated by the angle 2 calculating unit 117 are input to the subtraction amount calculating unit 115.

Next, a description will be given of calculation processing performed by the subtraction amount calculating unit 115. FIGS. 3A to 3H illustrate signal variation in the units 111 to 117 shown in FIG. 2 when an angular velocity caused by hand shake is input thereto. In FIG. 3A, an angular velocity output 301 of the angular velocity sensor 103 and an offset value 302 of the angular velocity calculated by the offset 1 calculating unit 111 are shown. A signal of the angle calculated by integrating the angular velocity output 301 is a signal 308 shown in FIG. 3F. An offset value 307 of the angle is also shown in FIG. 3F.

Next, a description will be given of calculation processing performed by the subtraction amount calculating unit 115. FIGS. 3A to 3H illustrate signal variation in the units 111 to 117 shown in FIG. 2 when an angular velocity caused by hand shake is input thereto. In FIG. 3A, an angular velocity output 301 of the angular velocity sensor 103 and an offset value 302 of the angular velocity calculated by the offset 1 calculating unit 111 are shown. A signal of the angle calculated by integrating the angular velocity output 301 is a signal 308 shown in FIG. 3F. An offset value 307 of the angle is also shown in FIG. 3F.

When a large angular velocity occurs in a panning operation, the output (the signal 308) of the angle calculating filter strays far away from the offset value 307, and then is converged to the offset value 307 for a period of time. When the calculated angle significantly deviates from the offset value, a long period of time is required until the signal 308 returns to close to the offset value 307, so that image shake correction cannot be performed. In particular, when the frequency band of image shake correction control is expanded to a lower frequency side, that is, when the cut-off frequency of the angle calculating filter is set to low, a time during which an image shake correction performance is degraded becomes longer. Thus, when the angular velocity is large, a signal from which an unnecessary angular velocity component not to be corrected has been cut off as much as possible is input to the angle calculating filter. The output of the angle calculating filter can be preferably controlled within a certain angle range centered at the angle offset value, resulting in an improvement in image shake correction performance immediately after panning.

Accordingly, in the present embodiment, an angular velocity subtraction amount is calculated by using an angle signal (previous sampling value of the angle 2) which is an image shake correction target value, the angular velocity subtraction amount is subtracted from an angular velocity, and then the resulting signal is integrated. In this manner, an image shake correction target value can be calculated while limiting the movable range of the correction member. Thus, even when a large shake occurs in a panning operation, image shake correction can be executed immediately after panning.

The subtraction amount calculating unit 115 calculates an angular velocity subtraction amount from the following values.

An angular velocity 303 (see FIG. 3B) after offset removal, which is obtained by subtracting the offset value 302 from the angular velocity output 301 in FIG. 3A.

An angle signal 309 (see FIG. 3D) after offset removal, which is obtained by subtracting the offset value 307 from the previous sampling value of the angle 2.

A gain calculation table shown in FIGS. 3G and 3H.

In FIG. 3G, the angle signal 309 after offset removal is plotted on the horizontal axis and the gain coefficient α is plotted on the vertical axis. The angle signal 309 after offset removal is compared with a threshold value. When the angle signal 309 after offset removal is equal to or less than the first threshold value A1, the value of the gain coefficient α is 0. When the angle signal 309 after offset removal is equal to or greater than the second threshold value A2, the value of the gain coefficient α is 1. When the angle signal 309 after offset removal lies between the threshold values A1 and A2, the gain coefficient α is a value derived by linear interpolation between 0 and 1.

In FIG. 3H, the angle signal 309 after offset removal is plotted on the horizontal axis and the gain coefficient β is plotted on the vertical axis. When the angle signal 309 after offset removal is equal to or greater than the third threshold value B1, the value of the gain coefficient β is 0. When the angle signal 309 after offset removal is equal to or less than the fourth threshold value B2, the value of the gain coefficient β is 1. When the angle signal 309 after offset removal lies between the threshold values B1 and B2, the gain coefficient β is a value derived by linear interpolation between 0 and 1.

The subtraction amount calculating unit 115 calculates an angular velocity subtraction amount from the gain coefficients α and β and the angular velocity 303 after offset removal. The angular velocity subtraction amount is calculated by the following formulae (2) and (3) but a gain coefficient varies depending on the sign of the angular velocity 303 after offset subtraction. In other words, when the sign of the angular velocity 303 after offset subtraction is positive, the gain coefficient α is multiplied by the angular velocity, whereas when the sign of the angular velocity 303 after offset subtraction is negative, the gain coefficient β is multiplied by the angular velocity.

[Formula 2]

When the angular velocity is positive,

Angular velocity subtraction amount=angular velocity after offset subtraction×β     (2)

[Formula 3]

When the angular velocity is negative,

Angular velocity subtraction amount=angular velocity after offset subtraction×β     (3)

A signal 304 shown in FIG. 3C is a signal obtained by further subtracting the angular velocity subtraction amount from the angular velocity 303 after offset subtraction. A signal 305 shown in FIG. 3E is a signal obtained by subtracting the angular velocity subtraction amount from the angular velocity output 301. A signal 306 shown in FIG. 3F is a signal of the angle calculated by integrating the signal 305. When a large shake occurs in a panning operation, the angular velocity component due to the influence may be cut off under the above control. Consequently, the convergence time taken until the control becomes stable immediately after panning becomes shorter, so that appropriate shake correction may be performed.

Next, a description will be given of a control effect according to the present embodiment with reference to FIGS. 4A and 4B. FIG. 4A illustrates a waveform 401 of the shake angle of an imaging apparatus. In this case, it is preferable that the target angle of image shake correction is the same as that of the waveform 401. However, in practice, the correctable range of an image shake correcting apparatus is limited, an offset is included in the output of the shake detecting unit, and the offset drifts with temperature. Thus, it is difficult to execute image shake correction in accordance with the waveform 401.

FIG. 4B illustrates an angle offset 404 generated by passing the angular velocity offset of the shake detecting unit (the angular velocity sensor 103) through an integrating filter. It is preferable that the target image shake correction angle is controlled by taking the angle offset 404 as a center. When the angular velocity subtraction processing described with reference to FIGS. 2 and 3 is not performed, an image shake correction angle 402 strays far away from the angle offset 404 during a panning operation, so that a long period of time is required until the image shake correction angle 402 returns again to the offset. As the cut-off frequency of the filter is set to a lower frequency side, a longer amount of time is taken for recovery. During the time period until the image shake correction angle 402 returns to the angle offset 404, the image shake correction angle 402 deviates from the waveform 401 indicating the actual camera shake angle, so that the appropriate correction effect cannot be obtained. Hence, the angular velocity subtraction processing described with reference to FIGS. 2 and 3 is performed, so that the image shake correction angle can be determined as shown in an angle 403 by taking the angle offset 404 as a center. Thus, an amount of control (correction angle) which is similar to the ideal shake target value (the waveform 401) can be calculated, so that appropriate image shake correction may be performed.

The angle can be calculated without using the HPF 109 under the above control. However, the calculated angle includes an offset under the influence of the output noise component of the angular velocity sensor 103. Hereinafter, a description will be given of how image shake correction is controlled based on the output of the angle 2 calculating unit 117 with an offset included therein.

FIG. 5 illustrates signal waveforms for explaining shake correction amount calculation processing during imaging and at the periods other than the imaging period. A waveform 501 indicates the angle 2 calculated by the angle 2 calculating unit 117. A waveform 502 indicates the angle 1 calculated by the angle 1 calculating unit 110. Since the HPF 109 is not used for calculating the angle 2, the influence of a temperature drift appears if a long period of time elapses after the power is turned on. For example, a temperature drift of the offset of the angular velocity sensor 103 occurs in a period 504, so that the angle 2 away from a zero center is calculated.

Figure 6:
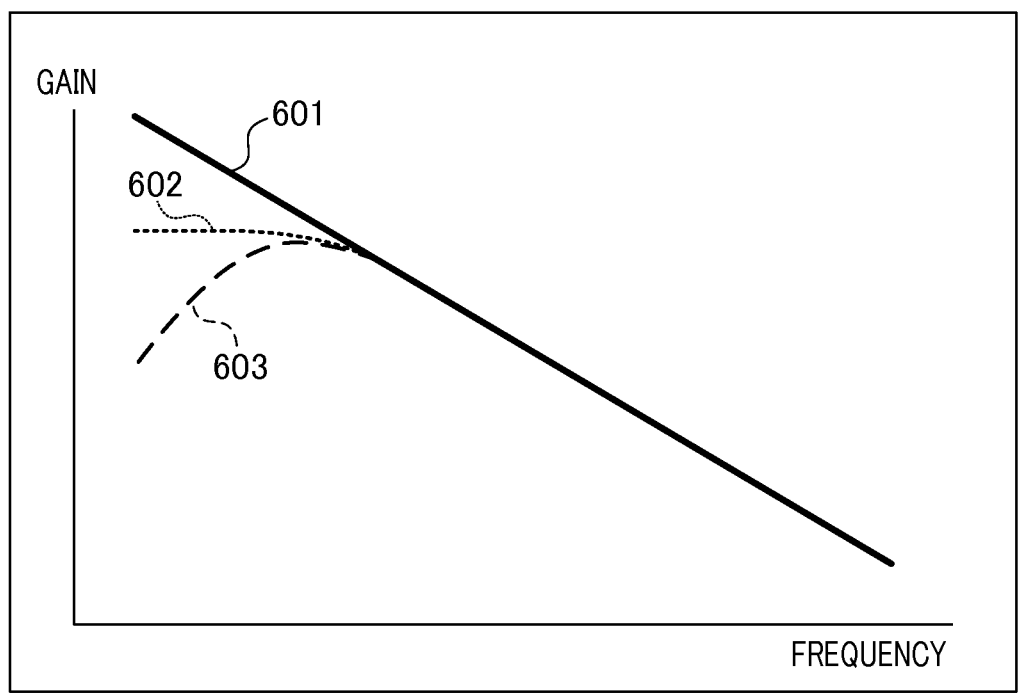
FIG. 6 is an explanatory diagram illustrating the gain characteristic of a filter according to the first embodiment of the present invention.

FIG. 6 illustrates the frequency-gain characteristic of an angle calculating filter. A graph line 601 indicates the filter characteristic of pure integration and corresponds to 1/s on the left side of Formula (1). A graph line 602 indicates the filter characteristic of an angle calculating filter, i.e., the filter characteristic of integration and HPF indicated by Formula (1). The graph line 602 indicates a flat characteristic in a low frequency band, and the gain characteristic for the angular velocity offset remains in the angle output. Thus, as the angular velocity offset increases by the influence of the temperature drift of the angular velocity sensor 103 in the period 504 shown in FIG. 5, the angle 2 indicated by the waveform 501 gradually deviates from the zero center.

The angle 1 is the output of the angle 1 calculating unit 110 shown in FIG. 2 and is a signal to be calculated by using both the integrating filter (integration and HPF) and the HPF 109. Thus, a filter characteristic in which the characteristic of the HPF 109 is added to the characteristic indicated by the graph line 602 exhibits a decrease in gain in a low frequency range as shown by a graph line 603. In other words, an offset component included in the output of the angular velocity sensor 103 can be removed, so that the angle is calculated at the zero center. Note that, since the characteristic of the HPF 109 is taken into account, the image shake correction effect immediately after a large shake caused by a panning operation or the like is weakened due to a swing-back phenomenon.

Thus, more appropriate image shake correction is performed by using the waveform 501 instead of the waveform 502 shown in FIG. 5. However, the waveform 501 exhibits the filter characteristic as shown in the graph line 602 in FIG. 6, i.e., the waveform 501 exhibits a flat gain characteristic in which the gain is not attenuated in a low frequency range. Angle calculation is performed with the output of the angular velocity sensor including an angular velocity offset component. Thus, when image shake correction is always performed by using the waveform 501, the offset included in the waveform 501 increases due to a temperature drift of an angular velocity offset component. The movable range of the correction member becomes insufficient as a time elapses, so that the correction member becomes incontrollable at its movable end. In the present embodiment, it is determined whether or not the imaging is in progress, and a signal indicated by a waveform 503 is used in the imaging period. A signal indicated by the waveform 502 is used in the preparation period (during EVF is being displayed, during AF (auto-focusing)/AE (auto-exposure) operation, or the like) prior to imaging. In this manner, the image shake correction effect is improved in the imaging period due to a filter characteristic expanded to a low frequency range. The image shake correction effect can be ensured to a certain extent in the period other than the imaging period, the precision of AF/AE control, the easiness of a framing operation by a photographer, and the like are improved.

In FIG. 5, a time 505 indicates the timing of start of imaging, and a time 506 indicates the timing of end of imaging. If control is made in accordance with the angle target position shown in the waveform 502 in the imaging period from the time 505 to the time 506, a swing-back may occur by the influence of the HPF 109 immediately after panning. In this case, control is made in a state different from the actual hand shake, resulting in a reduction in the image shake correction effect. In the present embodiment, a difference between the waveform 501 and the waveform 502 at the time 505 is calculated as an offset, and the offset is subtracted from the waveform 501. The waveform 503 indicates a temporal variation of a signal after offset subtraction. A signal indicated by the waveform 503 is used in the imaging period. Upon completion of imaging at the time 506, a signal is added to the signal indicated by the waveform 503 such that the waveform 503 returns to the waveform 502 at a constant speed. Finally, the waveform 503 coincides with the waveform 502.

Figure 7:
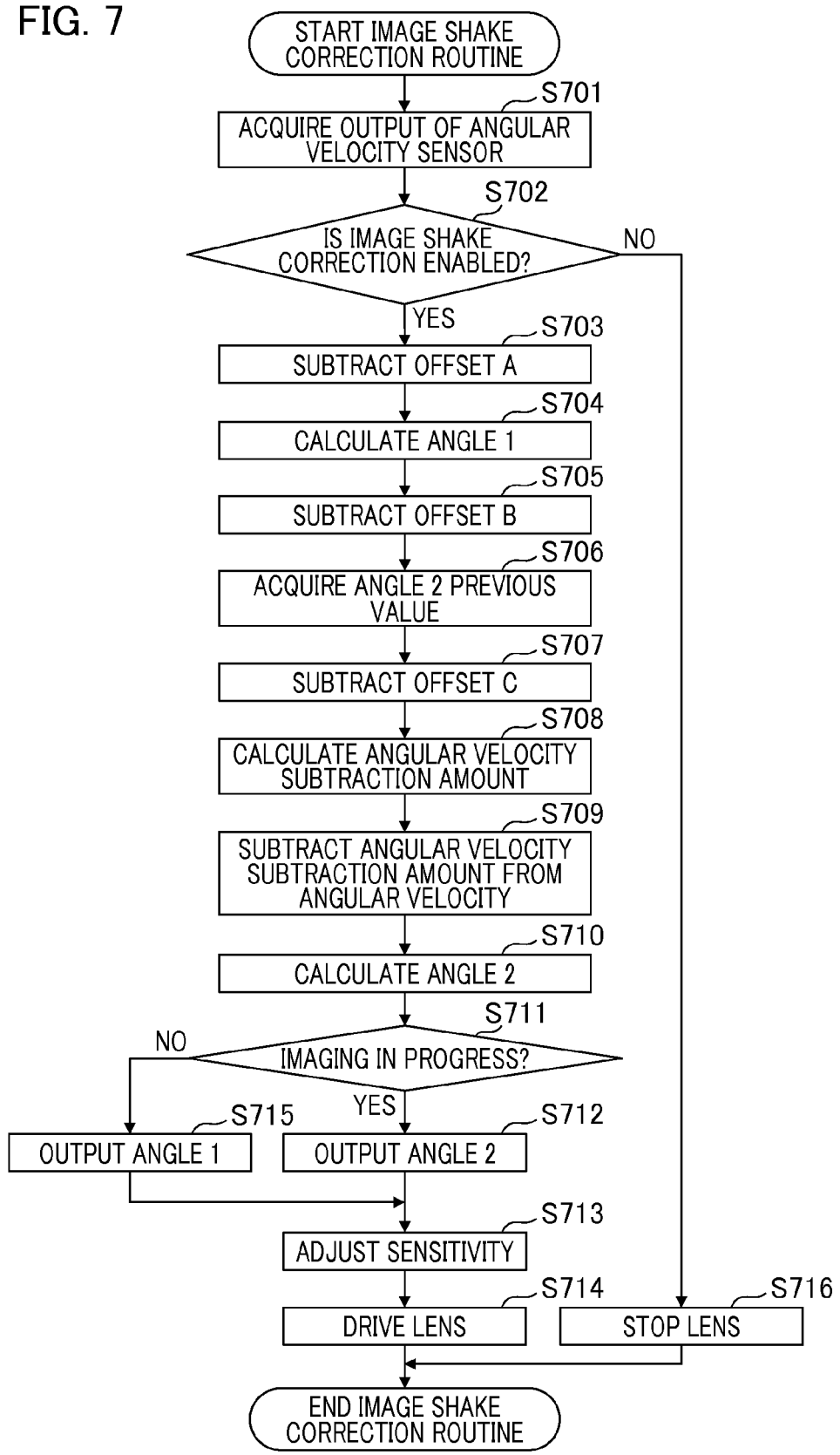
FIG. 7 is a flowchart illustrating image shake correction according to the first embodiment of the present invention.

Next, a description will be given of the image shake correction operation of the present embodiment with reference to the flowchart shown in FIG. 7. The processing shown in FIG. 7 starts when the main power supply to a camera is turned ON and is executed by the CPU 105 for each predetermined sampling cycle.

Firstly, in step S701, the CPU 105 acquires the output of the angular velocity sensor 103. In step S702, the CPU 105 determines whether or not image shake correction is enabled. If image shake correction is enabled, the process advances to step S703, whereas if shake correction is disabled, the process advances to step S716. The determination processing in step S702 determines that image shake correction is disabled during the time period until the output of the angular velocity sensor 103 becomes stable after the power is turned on. After the output of the angular velocity sensor 103 becomes stable, the determination processing in step S702 determines that image shake correction is enabled. In this manner, the image shake correction performance caused by performing image shake correction in a state where the output value of the angular velocity sensor 103 immediately after the power is turned on is unstable may be prevented from being degraded.

In step S703, the HPF 109 subtracts an offset (denoted as "A") from an angular velocity output so as to output the subtracted angular velocity. In step S704, the angle 1 calculating unit 110 integrates the angular velocity from which the offset A is subtracted so as to calculate the angle 1. In step S705, the offset 1 calculating unit 111 calculates an angular velocity offset (denoted as "B"), and then an subtracting unit 112 subtracts the offset B from the angular velocity so as to output the subtracted angular velocity. In step S706, the output of the angle 2 calculating unit 117 (previous sampling value) is acquired. In step S707, the offset 2 calculating unit 113 calculates an offset (denoted as "C") from the angle 2 acquired in step S706. The subtracting unit 114 subtracts the offset C from the angle 2 so as to output the subtracted angle. In step S708, the subtraction amount calculating unit 115 calculates an angular velocity subtraction amount from the angular velocity from which the offset B calculated in step S705 is subtracted and the angle from which the offset C calculated in step S707 is subtracted. Next, in step S709, the subtracting unit 116 subtracts the angular velocity subtraction amount from the angular velocity prior to offset subtraction. In step S710, the angle 2 calculating unit 117 integrates a signal obtained by subtracting the angular velocity subtraction amount from the angular velocity so as to calculate the angle 2.

In step S711, the signal switching unit 118 determines whether the imaging is in progress or not based on the output value of the release SW 104. If the imaging is not in progress, the process shifts to step S715, and the angle 1 is set as the target angle. Then, the process advances to step S713. On the other hand, if it is determined in step S711 that the imaging is in progress, the process shifts to step S712, and the angle 2 is set as the target angle so that the target angle indicated by the waveform 503 described with reference to FIG. 5 is set. In step S713, the sensitivity adjusting unit 119 multiplies the target angle by the sensitivity based on a focal distance and a shooting magnification obtained by the positional information 107 about the zoom lens and the focus lens so as to calculate an image shake correction target value. In step S714, the drive control unit 120 drives the correction lens based on the image shake correction target value. Then, an image shake correction subroutine ends, and the processing is pending until the next sampling time. When the process shifts to step S716, the drive control unit 120 stops driving of the correction lens and ends the image shake correction subroutine, so that the processing is pending until the next sampling time.

In the present embodiment, an angular velocity offset and an angle offset are calculated, and then a signal obtained by subtracting the angular velocity offset from the output of the angular velocity sensor and a signal obtained by subtracting the angle offset from the angle 2 are acquired. An angular velocity subtraction amount is calculated by using these signals, and then a signal obtained by subtracting the angular velocity subtraction amount from the output of the angular velocity sensor is integrated, so that a target image shake angle is determined. Thus, even if the output of the angular velocity sensor 103 includes an offset, an angle calculating filter can be formed without passing through the HPF 109. According to the present embodiment, highly accurate image shake correction may be performed in a wide frequency band using a filter in which the control band is expanded to a lower frequency side during imaging even when large vibration occurs due to a panning or a tilting operation.

Second Embodiment

Next, a description will be given of a second embodiment of the present invention. In the present embodiment, the same elements as those in the first embodiment are designated by the same reference numerals and detailed explanation thereof will be omitted. A description will be given mainly of the differences from the first embodiment. A description of the embodiments to be described below will be omitted in the same way.

Figure 8:
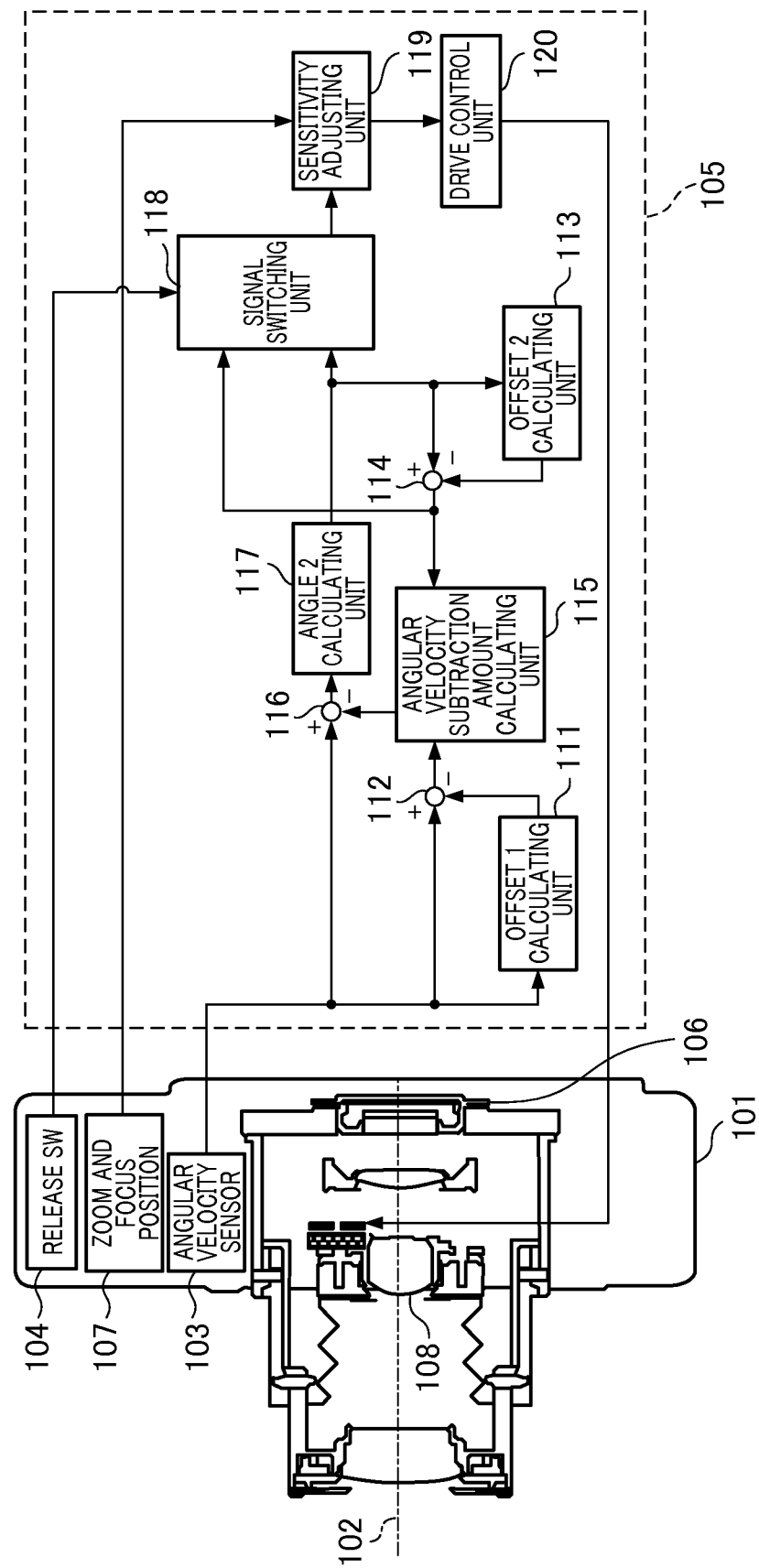
FIG. 8 is a top view and a control block diagram illustrating an imaging apparatus according to a second embodiment of the present invention.

FIG. 8 illustrates a configuration of an imaging unit of an imaging apparatus according to the present embodiment and a functional block diagram of image shake correction processing executed by the CPU 105. The differences between the configuration shown in FIG. 2 described in the first embodiment and the configuration shown in FIG. 8 are as follows:

In FIG. 8, the HPF 109 and the angle 1 calculating unit 110 shown in FIG. 2 are eliminated.

While the output of the angle 1 calculating unit 110 is input to the signal switching unit 118 in FIG. 2, a signal obtained by subtracting an angle offset from the output value of the angle 2 calculating unit 117 by the subtracting unit 114 is input to the signal switching unit 118 in FIG. 8. In other words, the first calculating unit is constituted by the offset 2 calculating unit 113 and the subtracting unit 114.

In the present embodiment, image shake correction is performed by using the output of the subtracting unit 114 prior to shooting but image shake correction is performed by using the output of the angle 2 calculating unit 117 during shooting. The output of the angle 2 calculating unit 117 is calculated as an angle including an offset component output from the angular velocity sensor 103. The offset 2 calculating unit 113 calculates an angle offset, and the subtracting unit 114 removes an angle offset under the influence of the offset of the angular velocity sensor 103. In other words, since the output of the subtracting unit 114 is an angle signal after offset removal, the output of the subtracting unit 114 is calculated in a range centered on zero. However, it is difficult to correctly determine an angular velocity offset and an angle offset, and thus, some error is included therein. When an offset is calculated by an LPF or when the average of signals is calculated, a phase delay or the like is applied to the actual offset. In consideration of the influence of an offset calculation error, image shake correction is executed by using the output of the angle 2 calculating unit 117 without directly using the output signal of the subtracting unit 114 during imaging. Even when there is a remaining shake under control by the influence of some phase delay or the like in a state prior to shooting, image shake can be suppressed to some extent without hindrance.

While, in the first embodiment, an image shake correction amount prior to imaging is calculated by using the HPF 109, the HPF 109 is not used in the present embodiment. Thus, the HPF 109 and the integrating filter (the angle 1 calculating unit 110) can be eliminated, so that highly accurate image shake correction can be realized while avoiding an increase in scale of a processing circuit and a processing program. A swing-back effect immediately after panning or the like is eliminated, resulting in an improvement in the image shake correction performance.

Third Embodiment

Next, a description will be given of a third embodiment of the present invention. As described in the first and second embodiments, when a large shake occurs due to panning or the like, appropriate image shake correction may be performed even in a filter configuration without including the HPF 109 while ensuring control stability immediately after panning. However, when a large error occurs during offset calculation, a long time may be required until image shake correction immediately after panning becomes stable by the influence of incorrect calculation during angular velocity subtraction processing. Thus, in the third embodiment, a description will be given of processing for reducing a time taken until image shake correction becomes stable immediately after panning even when an error occurs in an offset.

Figure 9:
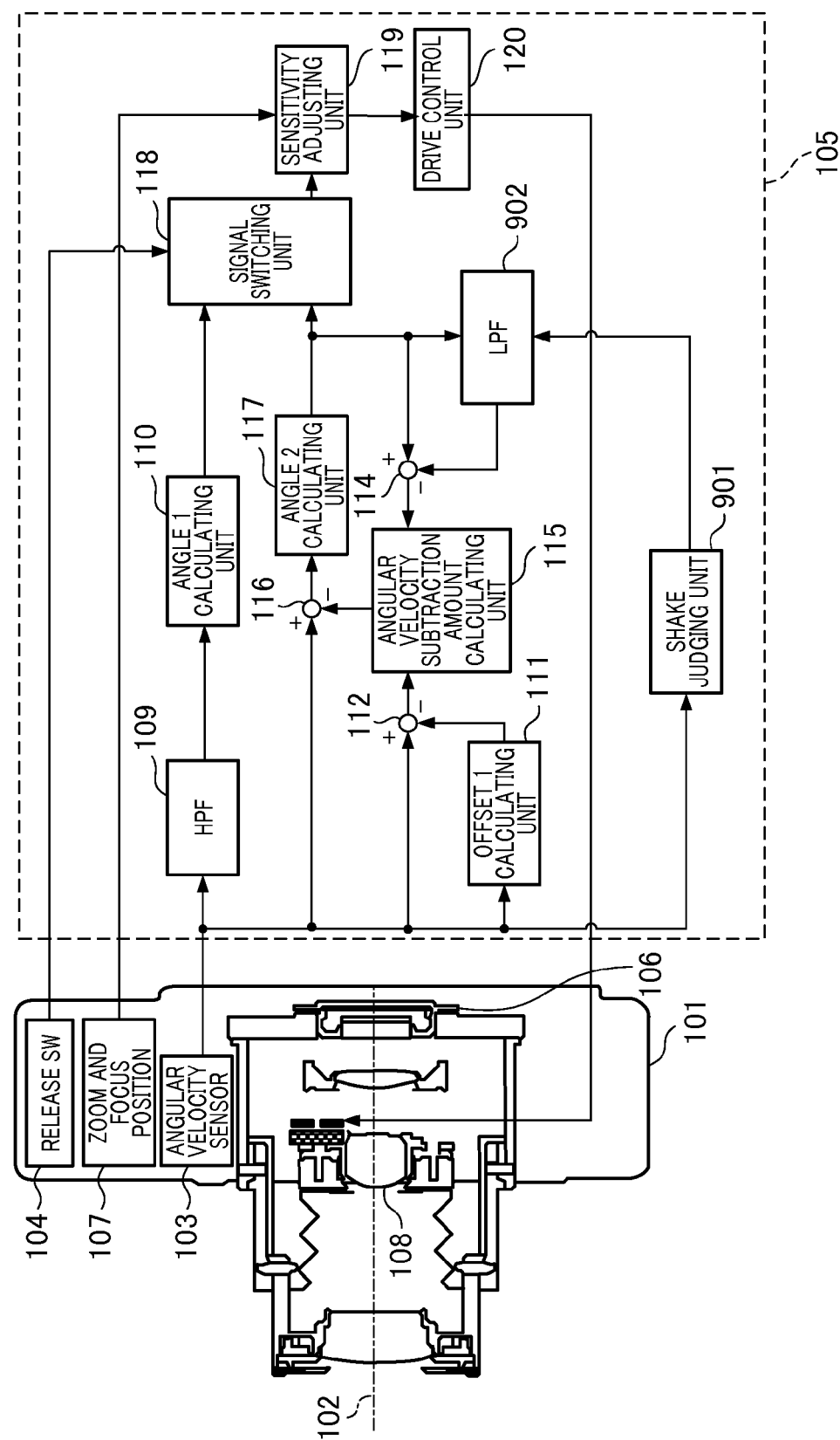
FIG. 9 is a top view and a control block diagram illustrating an imaging apparatus according to a third embodiment of the present invention.

FIG. 9 illustrates a configuration of an imaging unit of an imaging apparatus according to the present embodiment and a functional block diagram of image shake correction processing executed by the CPU 105. The configuration differences between FIG. 2 and FIG. 9 are as follows:

In FIG. 9, a low-pass filter (LPF) 902 is used instead of the offset 2 calculating unit 113, and the LPF 902 calculates an angle offset.

In FIG. 9, a shake determining unit 901 performs shake determination based on the output of the angular velocity sensor 103, and then outputs the determination result to the LPF 902.

Figure 10A:
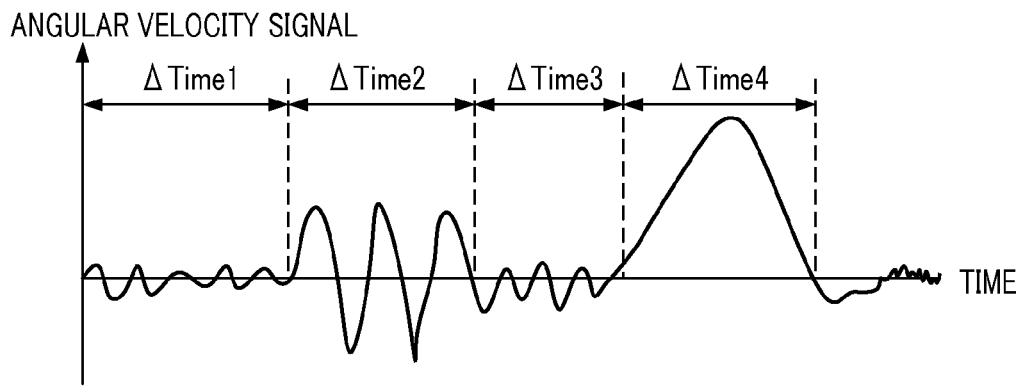
FIGS. 10A to 10C are explanatory diagrams illustrating a shake determining unit according to the third embodiment of the present invention.
Figure 10B:
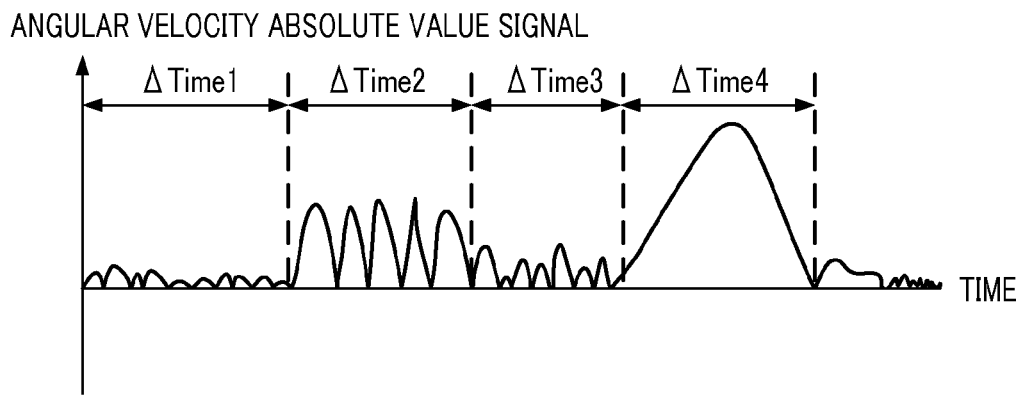
Figure 10C:
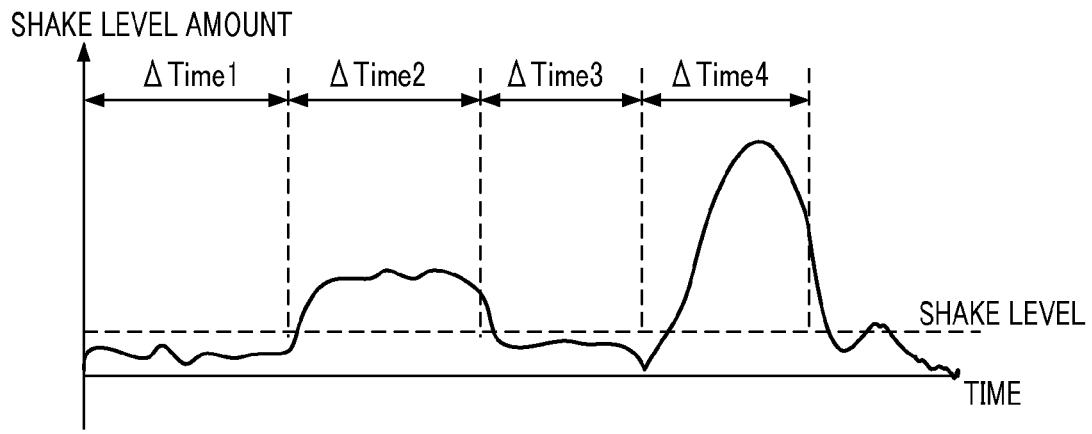

In the present embodiment, second offset calculation processing is performed by the shake determining unit 901 and the LPF 902. Firstly, a description will be given of a shake state determination value calculated by the shake determining unit 901 with reference to FIGS. 10A to 10C. The output of the angular velocity sensor 103 is input to the shake determining unit 901. FIG. 10A illustrates a waveform of an angular velocity signal after offset removal. This is a signal obtained by removing an offset from the angular velocity signal output from the angular velocity sensor 103 by the HPF 109 or a signal obtained by removing an offset calculated by the offset 1 calculating unit 111 from the angular velocity. FIG. 10B illustrates an angular velocity absolute value signal obtained by converting an angular velocity signal after offset removal to an absolute value. FIG. 10C illustrates a signal obtained by passing an angular velocity absolute value signal through an LPF (not shown), which is defined as a "shake level amount". In the period ΔTime1 and the period ΔTime3, the amplitude amount of the angular velocity signal is small, so that the hand shake state is small. This is, for example, the state where a photographer captures an image with his imaging apparatus consciously held in his hands so as not to cause shake of the imaging apparatus. In the period ΔTime2, the amplitude amount of the angular velocity signal is large, so that the hand shake state is very large. In the period ΔTime4, the photographer has intentionally moved his imaging apparatus by a panning operation or the like in order to change the composition of the imaging apparatus.

The shake determining unit 901 detects the shake level amount signal shown in FIG. 10C so as to determine whether or not hand shake is stable. When the shake level amount signal is larger than a predetermined threshold value "Shake Level", the shake determining unit 901 outputs a "large shake" as a determination value. In this case, examples of such a state include shooting with a very large hand shake (e.g., a state where a camera is gripped by a single hand of the photographer), during panning operation, and the like. When the shake level amount signal is equal to or less than a predetermined threshold value, the shake determining unit 901 outputs "small shake" as a determination value. In this case, the camera is firmly held by a photographer, so that the hand shake state is very small.

As described above, the determination value output from the shake determining unit 901 is output to the LPF 902. The LPF 902 is provided for calculating an angle offset. The output of the angle 2 calculating unit 117 is passed through the LPF 902 of which the cut-off frequency is set to extremely low, so that the angle offset is calculated. The cut-off frequency of the LPF 902 is changed depending on the determination value output from the shake determining unit 901. When the determination value output from the shake determining unit 901 is a "large shake", the cut-off frequency of the LPF 902 is set to a relatively small value. On the other hand, when the determination value output from the shake determining unit 901 is a "small shake", the cut-off frequency of the LPF 902 is set to a relatively large value. When the cut-off frequency of the LPF 902 is small, the following speed of the angle offset output from the LPF 902 is slow relative to the output of the angle 2 calculating unit 117. In other words, since a high frequency output is largely cut off, the angle offset output from the LPF 902 does not quickly follow the output of the angle 2 calculating unit 117 when there is an abrupt change in angle output in a state where a large shake occurs during a panning operation, resulting in no increase in error upon offset calculation. When the cut-off frequency of the LPF 902 is large, the following speed of the angle offset output from the LPF 902 becomes faster relative to the output of the angle 2 calculating unit 117. In other words, although offset calculation accuracy may be degraded due to the remaining high frequency output component, the convergence time taken until the angle offset output from the LPF 902 returns close to the actual offset value can be reduced even when an offset error temporarily increases.

As described above, in the present embodiment, the followability of an angle offset to a target angle is changed depending on the result of shake determination. An offset to be calculated does not abruptly change when a large shake occurs, whereas an offset readily changes when a small shake occurs.

Figure 11A:
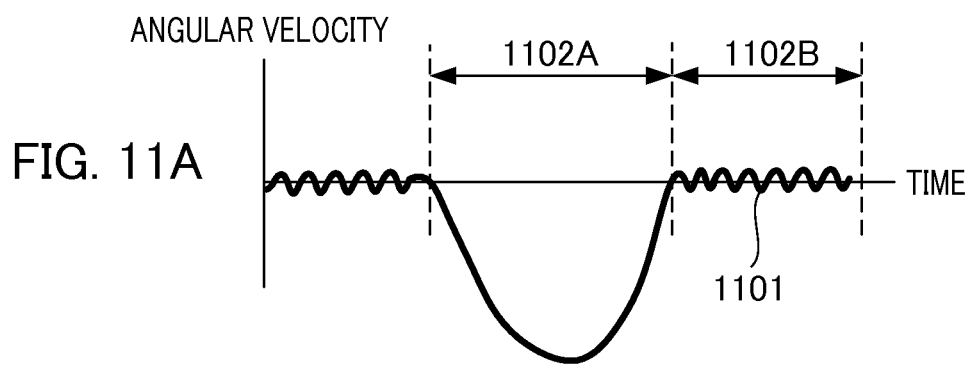
FIGS. 11A to 11C are explanatory diagrams illustrating shake correction amount calculation processing according to the third embodiment of the present invention.
Figure 11B:
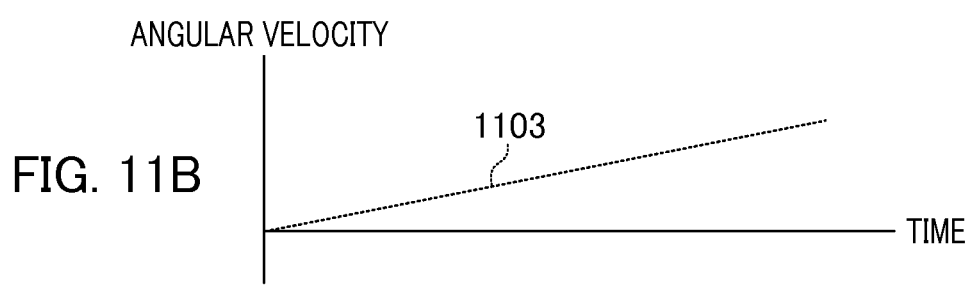
Figure 11C:
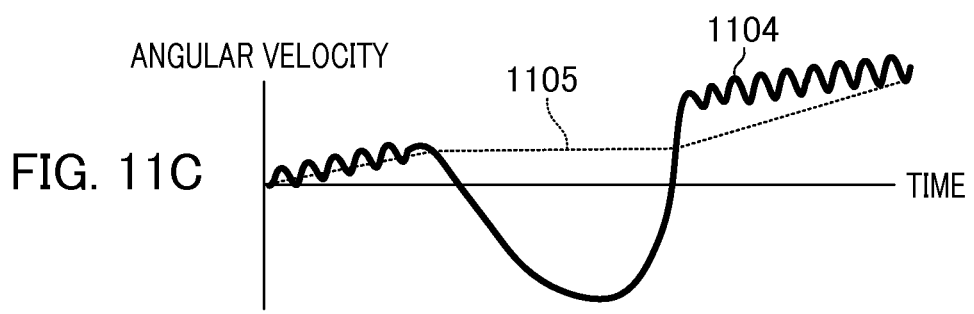

Next, a description will be given of the effect of the present embodiment with reference to FIGS. 11A to 14. FIGS. 11A to 11C illustrate a time variation of an angular velocity signal output from the angular velocity sensor 103. FIGS. 12D to 12G are waveform diagrams illustrating angular velocity subtraction processing performed when the cut-off frequency of the LPF 902 is a fixed value without changing the cut-off frequency of the LPF 902 using the determination value output from the shake determining unit 901. FIGS. 13H to 13K are waveform diagrams illustrating angular velocity subtraction processing performed when the cut-off frequency of the LPF 902 using the output of the shake determining unit 901 is changed. FIG. 14 illustrates the result of calculation of the target angle by comparing the case where the cut-off frequency of the LPF 902 is a fixed value with another case where the cut-off frequency of the LPF 902 is changed by using the output of the shake determining unit 901.

FIG. 11A illustrates an angular velocity 1101 of hand shake upon hand-held shooting. A period 1102A is a period during which a photographer performs a panning operation, where a large angular velocity occurs. A period 1102B is a period during which the photographer firmly holds his camera after completion of the panning operation. FIG. 11B illustrates a direct current noise component 1103 of the angular velocity sensor 103. The direct current noise component 1103 rises as the time elapses due to a drift associated with a change in temperature. FIG. 11C illustrates an output 1104 obtained by adding the angular velocity 1101 to the angular velocity of the direct current noise component 1103. The output 1104 is the angular velocity of the sensor output from the angular velocity sensor 103. In the present embodiment, the offset 1 calculating unit 111 shown in FIG. 9 calculates an angular velocity offset. It is originally preferable that a signal calculated by the offset 1 calculating unit 111 coincides with the offset (the direct current noise component 1103) of the actual sensor. However, in the period 1102A during which an angular velocity undesirably increases due to a panning operation or an extremely large hand shake, it is difficult to correctly calculate an angular velocity offset. Consequently, the angular velocity offset (an output 1105) calculated by the offset 1 calculating unit 111 is calculated as shown in FIG. 11C, so that the output 1105 deviates from the actual offset (the direct current noise component 1103). In particular, since an offset cannot be determined in the period 1102A, the deviation of offset occurs at the instant where the shake state is transitioned to a small shake state when the time taken for a panning operation is very long or when a large shake state lasts for a very long time.

Figure 12D:
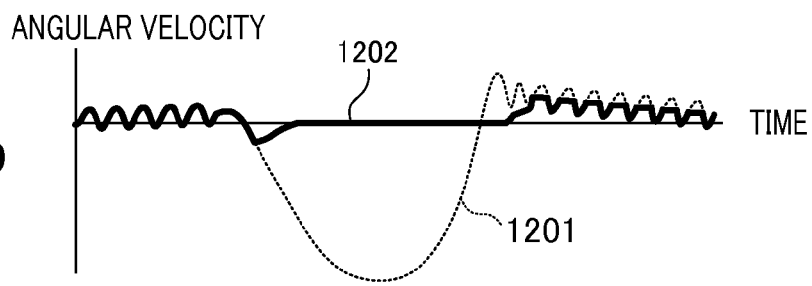
FIGS. 12D to 12G are explanatory diagrams illustrating angular velocity subtraction processing according to the third embodiment of the present invention.

FIGS. 12D to 12G illustrate angular velocity subtraction processing performed when the cut-off frequency of the LPF 902 is a fixed value without changing the cut-off frequency of the LPF 902 using the determination value output from the shake determining unit 901. FIG. 12D illustrates a signal 1201 obtained by subtracting the output 1105 of the offset 1 calculating unit 111 from the output 1104 of the angular velocity sensor 103. The signal is the output of the subtracting unit 112 shown in FIG. 9. The signal 1202 is a signal which is obtained by subtracting the offset 1 from the output 1104 of the angular velocity sensor 103 and then subtracting the output of the subtraction amount calculating unit 115 from the resulting output 1104 by the subtracting unit 116. The output of the subtraction amount calculating unit 115 is a difference between the signals 1201 and 1202.

Figure 12E:
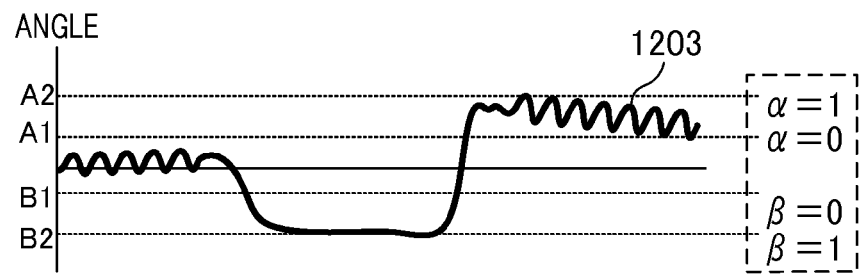
Figure 13H:
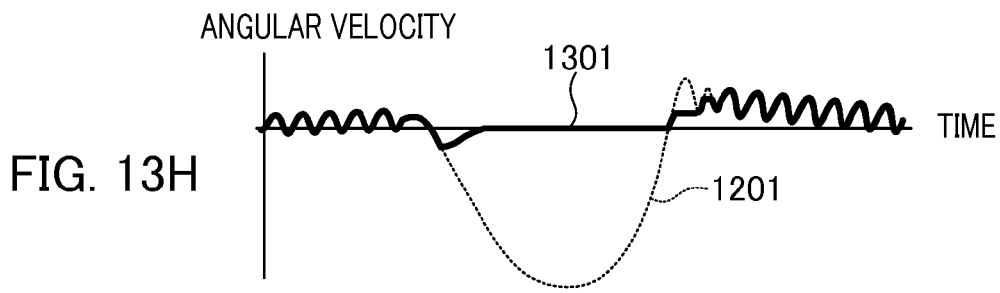
FIGS. 13H to 13K are diagrams illustrating angular velocity subtraction processing upon shake correction amount calculation according to the third embodiment of the present invention.

FIG. 12E illustrates a signal 1203 obtained by subtracting the angle offset calculated by the LPF 902 from the output (previous sampling value) of the angle 2 calculating unit 117 by the subtracting unit 114. As described in the first embodiment with reference to FIGS. 3A to 3H, the gain coefficients α and β are calculated depending on a fact as to whether or not the level of the signal 1203 exceeds a threshold value. The gain coefficient is multiplied by the signal 1203, so that an angular velocity subtraction amount is calculated.

Figure 12F:
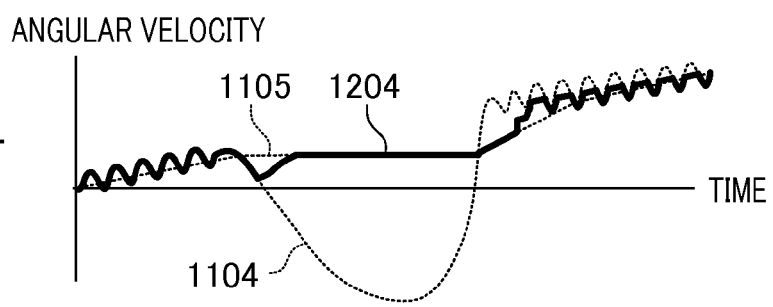
Figure 12G:
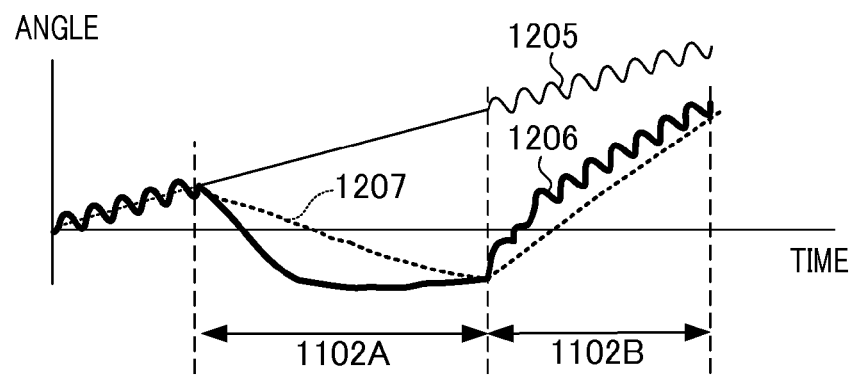

FIG. 12F illustrates a signal 1204 obtained by subtracting the output of the subtraction amount calculating unit 115 from the output 1104 of the angular velocity sensor 103 by the subtracting unit 116. FIG. 12G illustrates a signal 1205 of a hand shake angle when a component caused by a panning operation is removed from the angular velocity 1101. The signal 1205 is an ideal signal to be corrected. A target angle signal 1206 is an angle calculated by integrating the signal 1204, which is obtained by subtracting the output 1105 of the offset 1 calculating unit 111 from the output 1104 of the angular velocity sensor 103 by the subtracting unit 112, by the angle 2 calculating unit 117. A signal 1207 is an angle offset calculated by the LPF 902 using the signal 1206.

Here, when the cut-off frequency of the LPF 902 is a fixed value, the angle offset calculated by the LPF 902 quickly follows the output of the angle 2 calculating unit 117 in a large shake state such as a panning operation. Thus, the cut-off frequency of the LPF 902 is set to low in order to reduce an error upon offset calculation. For example, when an offset of a large error is calculated in the period 1102A, the signal 1207 which deviates substantially from the signal 1205 is calculated. Thus, the adverse effect of a large offset on correction becomes a problem when hand shake correction is originally in a stable state in the period 1102B. It is preferable that the signal 1206 is quickly converged to the signal 1205 in the period 1102B. However, angular velocity subtraction is performed so as to subtract an angular velocity in the positive direction by the influence of incorrect offset calculation. The longer the time (convergence time) needed for conversing the signal 1206 to the signal 1205, the longer the time until control becomes stable, which may cause an adverse effect on the image shake correction performance.

Next, a description will be given of processing for reducing a convergence time by changing the followability of an angle offset to a target angle depending on a shake determination value. FIGS. 13H to 13K are waveform diagrams illustrating angular velocity subtraction processing performed when the cut-off frequency of the LPF 902 is changed depending on the determination value output from the shake determining unit 901. FIG. 13H illustrates a signal 1301 obtained by subtracting the offset 1 from the output 1104 of the angular velocity sensor 103. The signal 1301 is a signal obtained by subtracting the output of the subtraction amount calculating unit 115 from the angular velocity output by the subtracting unit 116. The subtraction amount calculating unit 115 outputs the difference between the signals 1201 and 1301.

Figure 13I:
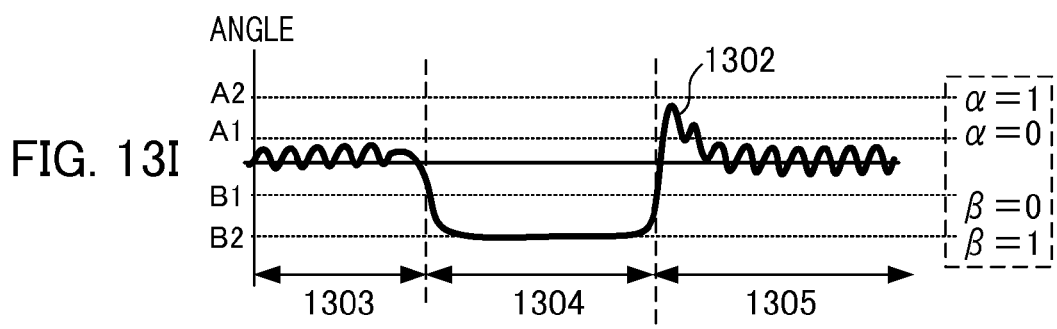
Figure 14:
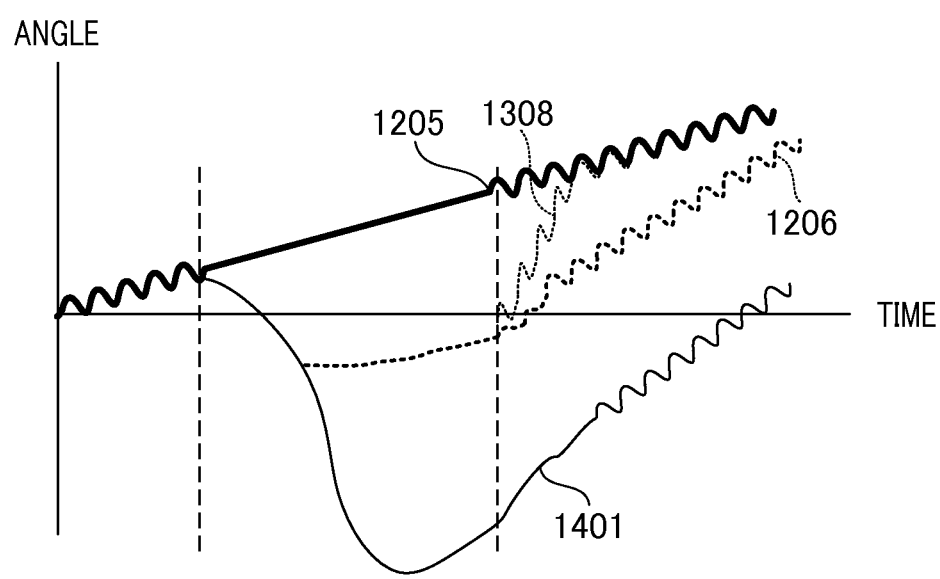
FIG. 14 is a diagram illustrating the angle calculation result of shake correction amount calculation according to the third embodiment of the present invention.

FIG. 13I illustrates a signal 1302 obtained by subtracting the angle offset calculated by the LPF 902 from the output (previous sampling value) of the angle 2 calculating unit 117 by the subtracting unit 114. Here, the shake determining unit 901 performs shake determination described with reference to FIGS. 10A to 10C. The angular velocity output is small in periods 1303 and 1305, and thus, the shake determining unit 901 determines that the determination value is "small shake". The angular velocity output is very large in a period 1304, and thus, the shake determining unit 901 determines that the determination value is "large shake". The cut-off frequency of the LPF 902 is changed depending on the magnitude of shake. The shake determining unit 901 determines that the determination value is "small shake" in the periods 1303 and 1305, and thus, the cut-off frequency of the LPF 902 is set to high. The shake determining unit 901 determines that the determination value is "large shake" in the period 1304, and thus, the cut-off frequency of the LPF 902 is set to low.

As described in the first embodiment with reference to FIGS. 3A to 3H, the gain coefficients α and β are calculated depending on a fact as to whether or not the signal 1203 exceeds a threshold value. The calculated gain coefficient is multiplied by the signal 1302, so that an angular velocity subtraction amount is calculated.

Figure 13J:
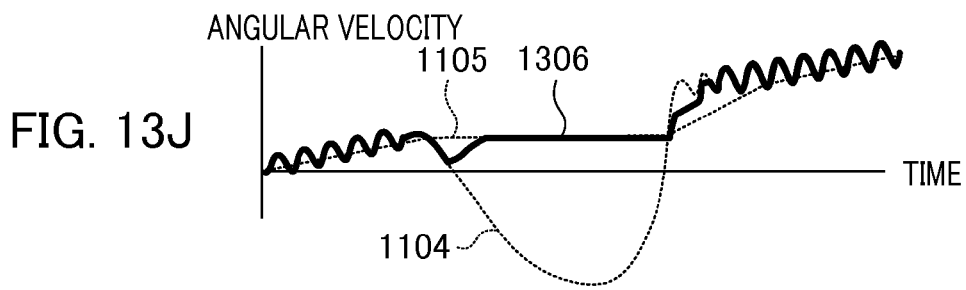
Figure 13K:
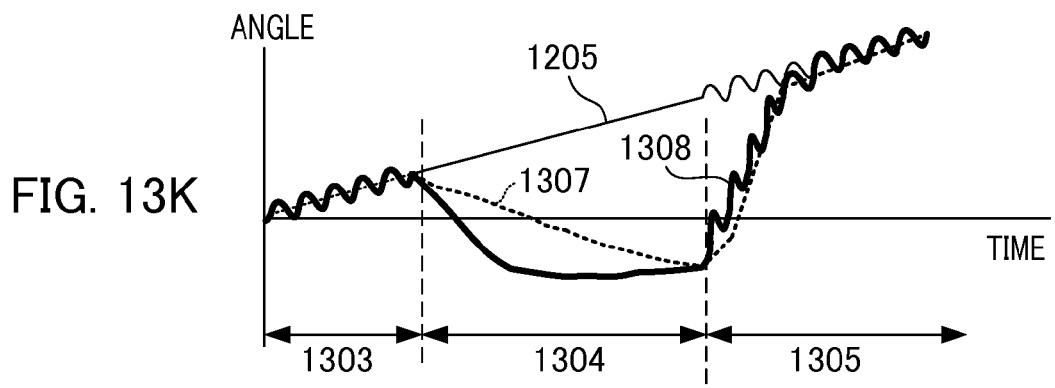

FIG. 13J illustrates a signal 1306 obtained by subtracting the output of the subtraction amount calculating unit 115 from the output 1104 of the angular velocity sensor 103 by the subtracting unit 116. FIG. 13K illustrates a target angle signal 1308 calculated by integrating the signal 1306, which is obtained by subtracting the output 1105 of the offset 1 calculating unit 111 from the output 1104 of the angular velocity sensor 103, by the angle 2 calculating unit 117. A signal 1307 is an angle offset calculated by the LPF 902 using the angle 2.

Since the cut-off frequency of the LPF 902 is set to low in the period 1304, abrupt offset variation does not occur. The cut-off frequency of the LPF 902 is set to high in the period 1305. For example, even if an error generated upon offset calculation increases in the period 1304, the signal 1307 easily follows the signal 1308 from a time point at which the period 1304 is transitioned to the period 1305. Thus, a convergence time for converging the signal 1307 to the proximity to the signal 1205 is reduced, so that the time needed for stable control can be reduced. Since the difference between the signal 1307 and the signal 1308 becomes small in the period 1305, the signal 1302 does not increase, so that the gain coefficients α and β do not increase. Thus, angular velocity subtraction is not executed (see FIGS. 12D to 12G) such that the time needed for converging the signal 1308 to the signal 1205 is reduced, resulting in an improvement in the image shake correction performance.

FIG. 14 is a waveform diagram illustrating the result of calculation of the target angles by comparing the case where the cut-off frequency of the LPF 902 is changed by using the determination value output from the shake determining unit 901 with another case where no change is made to the cut-off frequency of the LPF 902. The signal 1205 is as shown in FIGS. 12G and 13K, and a signal 1401 indicates a target angle obtained by integrating the output 1104 of the angular velocity sensor 103 (see FIG. 11C) without performing angular velocity subtraction processing. As shown in FIG. 12G, the signal 1206 indicates a target angle obtained when no change is made to the cut-off frequency of the LPF 902 depending on a shake determination value. As shown in FIG. 13K, the signal 1308 indicates a target angle obtained when the cut-off frequency of the LPF 902 is changed depending on the result of shake determination.

When the cut-off frequency of the LPF 902 is changed depending on a shake determination value immediately after panning, it can be seen in the present embodiment that the signal 1308 approaches the signal 1205 in the quickest manner. A target angle for the signal 1206 is calculated such that the signal 1206 significantly approaches the signal 1205 as compared with the signal 1401. However, a convergence time for converging the signal 1206 to the signal 1205 is longer than that of the signal 1308. According to the present embodiment, the time taken until image shake correction becomes stable immediately after panning is reduced by control such that the cut-off frequency of the LPF 902 for angle offset calculation is changed depending on a shake determination value, resulting in an improvement in the image shake correction performance.

Fourth Embodiment

Figure 15:
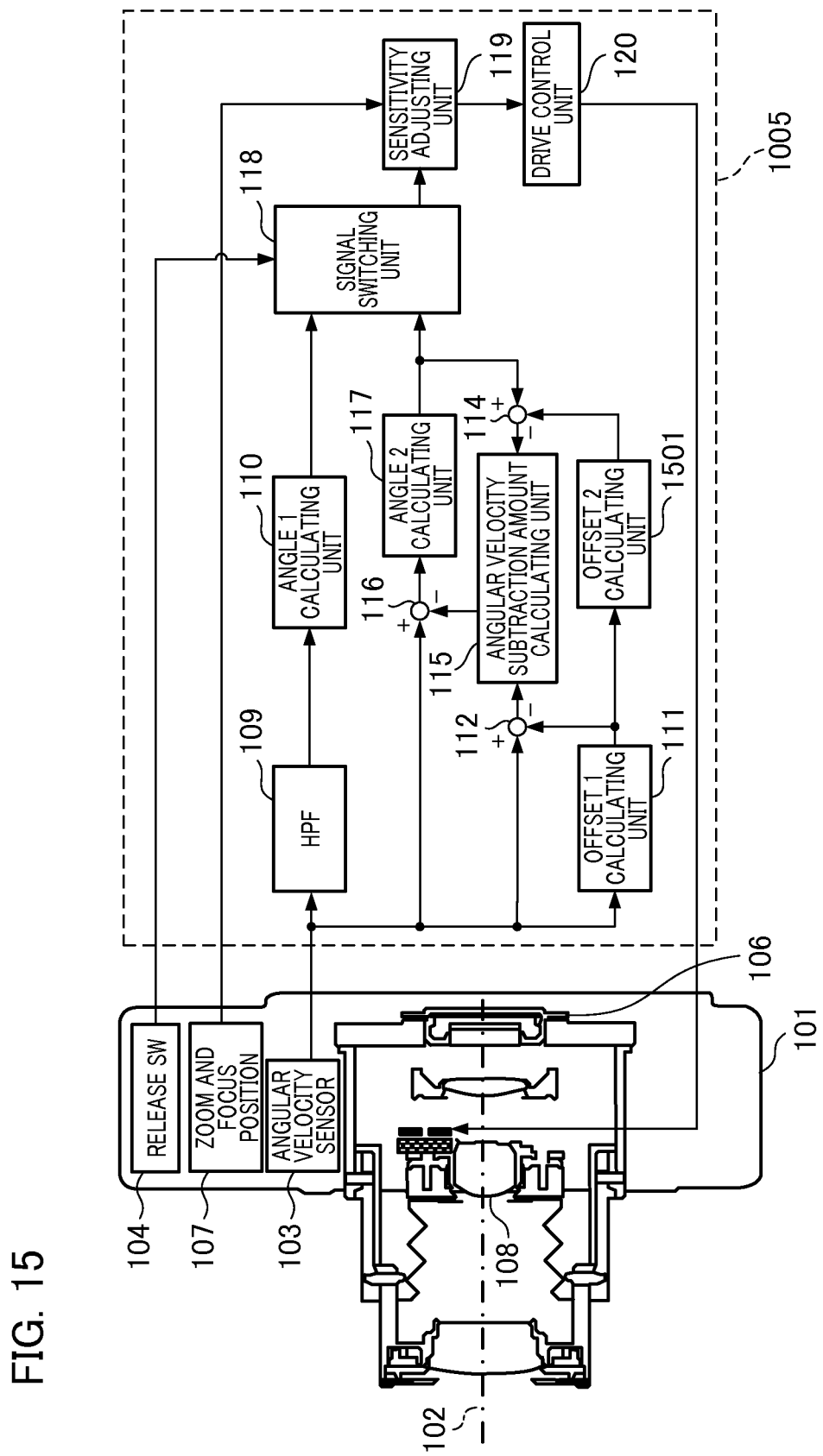
FIG. 15 is a top view and a control block diagram illustrating an imaging apparatus according to a fourth embodiment of the present invention.

FIG. 15 illustrates a configuration of an imaging unit of an imaging apparatus according to a fourth embodiment and a functional block diagram of image shake correction processing executed by the CPU 105. The configuration differences between FIG. 2 and FIG. 15 are as follows:

In FIG. 15, the offset 2 calculating unit 113 shown in FIG. 2 is removed, and an offset 2 calculating unit 1501 is provided instead of the offset 2 calculating unit 113.

The output of the offset 1 calculating unit 111 is input to the offset 2 calculating unit 1501, and the output of the offset 2 calculating unit 1501 is output to the subtracting unit 114.

In the present embodiment, an angle offset calculated by the offset 2 calculating unit 1501 is calculated from an angular velocity offset output from the offset 1 calculating unit 111. When the result of calculation by the offset 1 calculating unit 111 is obtained with high accuracy, an angle offset can be calculated by the filter characteristic shown by the graph line 602 in FIG. 6. Hereinafter, a description will be given of angle offset calculation processing performed by the offset 2 calculating unit 1501.

An angular velocity offset calculated by the offset 1 calculating unit 111 is input to the offset 2 calculating unit 1501, and an angle offset is calculated by using the following formula (4):

[Formula 4]

$$\text{Angle offset} = \text{angular velocity offset} \times T \quad (4)$$

As described in Formula (1), the angle 2 calculating unit 117 calculates an angle signal using a filter obtained by multiplying the LPF in which the time constant is set to T by T. The offset of a signal calculated by the angle 2 calculating unit 117 is calculated by multiplying the angular velocity offset at a low frequency where the gain characteristic of the LPF becomes 0 dB (decibel) by the time constant T. Since the amount of offset of the input signal from the angle 2 calculating unit 117 has already been calculated by the offset 1 calculating unit 111, an angle offset passed through the angle 2 calculating unit 117 can be calculated by multiplying the output of the offset 1 calculating unit 111 by the time constant T.

As described in the first embodiment, after offset calculation, the angular velocity offset calculated from the offset 1 calculating unit 111 is subtracted from the output of the angular velocity sensor 103 by the subtracting unit 112. The angle offset calculated from the offset 2 calculating unit 1501 is also subtracted from the output value (previous sampling value) of the angle 2 calculating unit 117 by the subtracting unit 114. The results of subtraction are input to the subtraction amount calculating unit 115, so that an angular velocity subtraction amount is calculated. After the subtracting unit 116 subtracts the angular velocity subtraction amount from the output of the angular velocity sensor 103, the angle 2 calculating unit 117 calculates a target angle, so that image shake correction is performed.

According to the present embodiment, when the offset 1 calculating unit 111 calculates an angular velocity offset with high accuracy, an angle offset can be calculated only by multiplying the angular velocity offset by the time constant T. Thus, highly accurate image shake correction can be performed while avoiding an increase in scale of a processing circuit and a processing program.

Other Embodiments

In the first to fourth embodiments, a description has been given of a method called "optical anti-vibration" in which the correction lens serving as a shake correcting unit is moved within a plane perpendicular to the optical axis. The present invention is not limited thereto but the following methods may also be employed.

A method for performing image shake correction by moving an imaging element within a plane perpendicular to the optical axis.

An electronic anti-vibration method for mitigating the effects of shake by changing the image segmenting position of each of captured frames output from the imaging element.

A method for performing image shake correction by combining a plurality of controls.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2013-160278 filed on Aug. 1, 2013, which is hereby incorporated by reference herein in its entirety.

What is claimed is:

1. An image shake correcting apparatus comprising:
    a shake detecting unit configured to detect shake;
    a calculating unit configured to calculate an image shake correction amount by acquiring a shake detection signal output from the shake detecting unit; and
    a shake correcting unit configured to correct image shake in accordance with the image shake correction amount calculated by the calculating unit,
    wherein the calculating unit comprises:
        a first offset calculating unit configured to calculate a first offset from the shake detection signal;
        a second offset calculating unit configured to calculate a second offset from the output of the calculating unit; and
        a subtraction amount calculating unit configured to calculate a subtraction amount by acquiring a signal obtained by subtracting the first offset from the shake detection signal and a signal obtained by subtracting the second offset from a previously-calculated image shake correction amount, and
    wherein the calculating unit integrates a signal obtained by subtracting the subtraction amount calculated by the subtraction amount calculating unit from the shake detection signal to calculate the image shake correction amount.

2. The image shake correcting apparatus according to claim 1, wherein the subtraction amount calculating unit compares a signal obtained by subtracting the output of the second offset calculating unit from the image shake correction amount with a threshold value to calculate a gain coefficient, and then multiplies a signal obtained by subtracting the first offset from the shake detection signal by the gain coefficient to calculate the subtraction amount.

3. The image shake correcting apparatus according to claim 2, wherein the subtraction amount calculating unit sets the gain coefficient to a larger value as the difference between a signal obtained by subtracting the output of the second offset calculating unit from the image shake correction amount and the threshold value increases.

4. The image shake correcting apparatus according to claim 1, wherein the second offset calculating unit calculates the second offset by acquiring the image shake correction amount from a previous sampling.

5. The image shake correcting apparatus according to claim 1, wherein the second offset calculating unit performs shake determination of an apparatus and then changes a followability to the image shake correction amount depending on a determination value to calculate the second offset.

6. The image shake correcting apparatus according to claim 5, wherein the second offset calculating unit comprises a determining unit configured to determine shake of the device by acquiring the shake detection signal and a low-pass filter, and changes a cut-off frequency of the low-pass filter using the determination value for shake determination by the determining unit.

7. The image shake correcting apparatus according to claim 6, wherein the cut-off frequency of the low-pass filter is set to low when the determining unit determines that shake of the device is greater than a threshold value, whereas the cut-off frequency of the low-pass filter is set to high when the determining unit determines that shake of the apparatus is less than a threshold value.

8. The image shake correcting apparatus according to claim 1, wherein the second offset calculating unit acquires the output of the first offset calculating unit, and then multiplies the output by a time constant to calculate the second offset.

9. The image shake correcting apparatus according to claim 1, wherein the calculating unit further comprises:
 a first calculating unit configured to calculate a first image shake correction amount by acquiring the shake detection signal;
 a second calculating unit configured to calculate a second image shake correction amount by acquiring the shake detection signal; and
 a switching unit configured to perform switching between the first image shake correction amount and the second image shake correction amount,
 wherein image shake correction is performed based on the first image shake correction amount or the second image shake correction amount.

10. The image shake correcting apparatus according to claim 9, wherein the first calculating unit integrates a signal obtained by removing an offset from the shake detection signal to calculate the first image shake correction amount, and the second calculating unit calculates the subtraction amount using a signal obtained by subtracting the output of the first offset calculating unit from the shake detection signal and a signal obtained by subtracting the output of the second offset calculating unit from the second image shake correction amount acquired in the previous sampling, and then integrates a signal obtained by subtracting the subtraction amount from the shake detection signal to calculate the second image shake correction amount.

11. The image shake correcting apparatus according to claim 10, wherein the first calculating unit removes an offset from the shake detection signal using a high-pass filter.

12. The image shake correcting apparatus according to claim 9, wherein the first calculating unit subtracts the output of the second offset calculating unit from the second image shake correction amount acquired in the previous sampling to calculate the first image shake correction amount, and the second calculating unit calculates the subtraction amount using a signal obtained by subtracting the output of the first offset calculating unit from the shake detection signal and a signal obtained by subtracting the output of the second offset calculating unit from the second image shake correction amount acquired in the previous sampling, and then integrates a signal obtained by subtracting the subtraction amount from the shake detection signal to calculate the second image shake correction amount.

13. A lens barrel comprising:
 the image shake correcting apparatus according to claim 1.

14. Optical apparatus comprising:
 The image shake correcting apparatus according to claim 1.

15. An imaging apparatus comprising:
 the lens barrel according to claim 13.

16. An imaging apparatus comprising:
 the image shake correcting apparatus according to claim 9,
 wherein the switching unit selects the second image shake correction amount during an imaging period and the switching unit selects the first image shake correction amount prior to imaging so that the shake correcting unit performs image shake correction.

17. A control method to be executed by an image shake correcting apparatus that comprises a shake detecting unit configured to detect shake; a calculating unit configured to calculate an image shake correction amount by acquiring a shake detection signal output from the shake detecting unit; and a shake correcting unit configured to correct image shake in accordance with the image shake correction amount calculated by the calculating unit, the method comprising:
 calculating, by the calculating unit, a first offset from the shake detection signal and a second offset from the output of the calculating unit;
 calculating, by the calculating unit, a subtraction amount by acquiring a signal obtained by subtracting the first offset from the shake detection signal and a signal obtained by subtracting the second offset from a previously-calculated image shake correction amount, and
 calculating, by the calculating unit, the image shake correction amount by integrating a signal obtained by subtracting the subtraction amount from the shake detection signal.

* * * * *